United States Patent
Oyama et al.

(10) Patent No.: US 7,557,166 B2
(45) Date of Patent: *Jul. 7, 2009

(54) GEL-TYPE POLYMER ELECTROLYTE AND USE THEREOF

(75) Inventors: Noboru Oyama, 3-10-7 Kichijyoji Higashicho, Musashino-shi, Tokyo (JP) 180-0002; Yuki Fujimoto, Tokyo (JP); Yoshiyuki Iwase, Chichibu (JP); Kouichi Nishijima, Chiba (JP)

(73) Assignees: Du Pont-Mitsui Polychemicals Co. Ltd, Tokyo (JP); Noboru Oyama, Tokyo (JP)

( * ) Notice: Subject to any disclaimer, the term of this patent is extended or adjusted under 35 U.S.C. 154(b) by 983 days.

This patent is subject to a terminal disclaimer.

(21) Appl. No.: 10/399,377

(22) PCT Filed: Oct. 18, 2001 (Under 37 CFR 1.47)

(86) PCT No.: PCT/JP01/09138
§ 371 (c)(1), (2), (4) Date: Aug. 9, 2004

(87) PCT Pub. No.: WO02/33765
PCT Pub. Date: Apr. 25, 2002

(65) Prior Publication Data
US 2006/0204854 A1    Sep. 14, 2006

(30) Foreign Application Priority Data
Oct. 18, 2000 (JP) .............................. 2000-318169

(51) Int. Cl.
*H01M 6/18* (2006.01)
*H01M 10/40* (2006.01)
*C08F 8/14* (2006.01)
*C08F 20/02* (2006.01)

(52) U.S. Cl. ................. 525/329.7; 525/330.3; 525/384; 525/385; 525/386; 429/33; 429/46; 429/303

(58) Field of Classification Search .................. 429/46, 429/303, 33; 525/329.7, 330.3, 384, 385, 525/386
See application file for complete search history.

(56) References Cited

U.S. PATENT DOCUMENTS

| 4,081,587 | A | 3/1978 | Clampitt et al. |
| 4,438,008 | A | 3/1984 | Oeder et al. |
| 6,372,387 | B1 | 4/2002 | Kawakami et al. |
| 7,285,360 | B2 * | 10/2007 | Maruyama et al. .......... 429/303 |

FOREIGN PATENT DOCUMENTS

| EP | 0 948 074 A2 | 10/1999 |
| EP | 0 937 181 B1 | 10/2002 |

OTHER PUBLICATIONS

Hallden et al., Journal of Applied Polymer Science 60 (1996) 2495-2501.*
Asa Hallden et al, Preparation and Characterization of Poly(ethylene-graft-ethylene oxide), J. Appl. Polymer Science, Col. 66, 2495-2502 (1996).
Asa Hallden et al, Surface Modification of LDPE with PE-PEO Graft Polymer, J. Appl. Polymer Science, vol. 75, 316-326 (2000).

* cited by examiner

*Primary Examiner*—Roberto Rábago (57) ABSTRACT

A gel-type polymer electrolyte, wherein said polymer comprises (A) an ethylene-unsaturated carboxylic acid copolymer or a derivative thereof and (B) a polyalkylene oxide having a hydroxyl group at one terminal thereof or a derivative thereof, which are bonded together by an ester bond. The gel-type polymer electrolyte has a high ionic conductivity, and makes it possible to provides a cell which has excellent charge/discharge characteristics at low temperatures as well as at high temperatures.

25 Claims, 3 Drawing Sheets

GEL-TYPE POLYMER ELECTROLYTE AND USE THEREOF

TECHNICAL FIELD

The present invention relates to a gel-type polymer electrolyte comprising a non-halogen type polymer, and, particularly, to a polymer electrolyte that can be molded into a self-supported (self-erected) film and can, particularly, be used for polymer lithium cells suppressing the formation of lithium dendrite (tree-like traces) that occurs on the negative electrode surface when being electrically charged. The electrolyte can further be used for the capacitor.

PRIOR ART

The lithium secondary cells that have now been placed in the market are using, as electrode materials, a carbon-intercurlated material as a negative electrode and lithium cobaltate ($LiCoO_2$) as a positive electrode to reversibly release and receive lithium ions accompanying the electric charge and discharge. Further, the electrolyte is used being dissolved in a lithium salt. What is generally called polymer lithium cell is a so-called polymer electrolyte cell using a polymer electrolyte instead of a liquid electrolyte.

The polymer electrolyte cells are all of the solid type and are free from the leakage of liquid, features high degree of safety, excellent workability, making it possible to decrease the thickness of the cell or to laminate the cells. The polymer electrolyte cell must use a polymer material that exhibits an ionic conductivity of the order of as high as $10^{-3}$ S/cm. As for polymerizing the electrolyte, development and study have been forwarded concerning chiefly polyethylene oxide (PEO), polyacrylonitrile (PAN), polymethyl methacrylate (PMMA) and polyvinylidene fluoride (PVDF). In particular, there have been developed several polymer gel electrolytes of the type of PAN and PVDF owing to that the polymer that holds a solution containing 40 to 80%, preferably 40 to 70% of a lithium salt exhibits excellent film strength. In Japan, polymer gel electrolyte lithium cells using fluorine-contained polymer gel electrolyte have already been mass-produced since 1999.

Owing to their thin thickness and light weight, the lithium polymer secondary cells have been realized satisfying the conditions for use in mobile equipment and, particularly, cellular phones, note PC, PDA and are reliably finding applications. It is no longer a dream that they can be applied to electric vehicles (EVs) in the near future. This is because, with the conventional liquid cells, the energy density and the output density were not compatible with each other. However, it has recently been learned that the lithium polymer secondary cell is an ideal cell offering a high energy density of not smaller than 165 W/kg and a high output density of not smaller than 1200 W/kg.

However, the polymer electrolyte used for the lithium polymer secondary cells must satisfy further improved properties such as (1) it does not leak the liquid, (2) it is flame-resistant, (3) it favorably possess high heat conductivity, (4) it favorably possess high ionic conductivity over a wide temperature range, (5) it has a large mechanical strength and (6) it is chemically inert.

As for the fluorine-contained polymer materials that have now been widely used, there remains a problem concerning the treatment after the cells are used, since fluorine is a component constituting the polymer matrix. It has therefore been desired to provide a nonhalogen type polymer electrolytic material having electrolytic properties comparable to, or superior to, those of the fluorine-contained polymer gel electrolyte.

Poly(acrylnitrile) (PAN) type and poly(methyl methacrylate) (PMMA) type polymer materials are candidates of the nonhalogen type polymer gel electrolyte. However, these self-supported films are not capable of absorbing and holding large amounts of the electrolytic solution unlike the film of polyvinylidene fluoride (PVDF) type, and cannot be used by being simply sandwiched as a self-supported film electrolyte between the positive electrode and the negative electrode at the time of fabricating the cell.

The lithium ion cells placed in the market are using a negative electrode material of carbon capable of intercurlating lithium ions. However, lithium metal secondary cells, too, using a single metal of lithium or an alloy of lithium and other metals as the negative electrode, have been expected as secondary cells that provide large energy densities. At present, however, they have not yet been realized as commercial products being hindered by several problems.

Among them, what is most desired to be solved is the problem related to the formation and growth of lithium dendrite accompanying the electric charge and discharge. Even the negative electrode of a lithium-inserted carbon material involves a problem that dendrite occurs under a quickly charging condition.

If allowed to grow continuously, lithium dendrite multiplies to cause a short-circuit inside the cell. If an internal short-circuit takes place, a heavy current flows instantaneously through the dendrite producing sparks, combustion occurs, high temperature and high pressure are generated, which may result in the occurrence of explosion. Therefore, a variety of methods have been studied to prevent the internal short-circuit. If the internal short-circuit could be prevented, the life of the cell can be extended and can be further increased.

Japanese Unexamined Patent Publication (Kokai) No. 167280/1985 discloses a rechargeable electrochemical device that suppresses the occurrence of lithium dendrite by using, as the negative electrode, an alloy of lithium and other metals.

Methods have further been studied for suppressing the occurrence of lithium dendrite by using an ion-conducting inorganic solid electrolyte, a polymer gel electrolyte or a solid polymer electrolyte. For example, Oyama et al. reports that the polyacrylonitrile (PAN) gel electrolyte (not less than 5% by weight relative to the non-aqueous solvent) suppresses the occurrence of metal lithium dendrite (Report of the Results of Study, New Energy/Industrial Technology Overall Development Organization (NEDO) of the year 1996, reported on March, 1997).

Concerning the new lithium cells, further, it has been desired that the cells swiftly operate within limited charging/discharging time accompanying an increase in the energy density of the cells. In particular, it has been desired to provide cells that work to a sufficient degree at low temperatures. The same characteristics are also desired for the capacitors.

Due to their principle of operation, in general, the properties of the cells and capacitors are limited by the migrating speed of ions and distance of migration. In the case of the cells, it is impossible to greatly increase the speed of migration of ions in the electrolyte and in the active substance of electrode. To solve the problem, therefore, the distance of migration of ions must be shortened and the cell must be constituted by using a material having wide reaction areas.

In the case of the capacitors, too, the charging/discharging time can be conspicuously shortened if carrier ions move fast.

In order to enhance the performance, therefore, the distance between the electrodes must be shortened and the reaction area must be widened like the case of constituting the cells. For this purpose, it is necessary to prepare a thin electrolyte film having a very small thickness and a large mechanical strength.

Even when the gel-like polymer is used for forming the electrolyte, first, lithium ions are transported through the electrolyte phase in the polymer matrix. Like in the solution electrolyte, therefore, the reaction current concentrates on a portion on the surface of the negative electrode, and lithium locally precipitates inducing the precipitation of lithium like dendrite. Second, the mechanical strength is weaker than that of the solid polymer.

In the conventional totally solid and gel-like polymer electrolytes, the ions were not conducted to a sufficient degree. In the case of the gel-like polymers, further, the liquid could not be favorably retained at high temperatures.

DISCLOSURE OF THE INVENTION

It is a first object of the present invention to provide a novel polymer electrolyte having a high ionic conductivity, which is useful for forming cells that exhibit excellent charging/discharging characteristics at low temperatures as well as at high temperatures.

It is a second object of the present invention to provide a polymer electrolyte capable of suppressing the precipitation of lithium in the form of dendrite.

According to the present invention, there is provided a gel-type polymer electrolyte, wherein said polymer comprises (A) an ethylene-unsaturated carboxylic acid copolymer or a derivative thereof and (B) a polyalkylene oxide having a hydroxyl group at one terminal thereof or a derivative thereof, which are bonded together by an ester bond.

The ester bond is formed, for example, by the esterification of a carboxylic acid group of the ethylene-unsaturated carboxyl acid copolymer with the polyalkylene oxide having a hydroxyl group at one terminal thereof or with a derivative thereof, or is formed by the transesterification reaction of an alkyl ester of the ethylene-unsaturated carboxylic acid copolymer or an alkyl ester derivative thereof with the polyalkylene oxide having a hydroxyl group at one terminal thereof or a derivative thereof.

Hereinafter, the invention is described chiefly with reference to the case of introducing the ester bond by the esterification reaction. When the preferred embodiment differs depending upon the esterification reaction and the transesterification reaction, the introduction of the ester bond by the transesterification reaction will be described each time.

In the gel-type polymer electrolyte of the present invention, it is desired that:

1. The ester bond is formed by reacting (esterifying) an ethylene-unsaturated carboxylic acid copolymer or a derivative thereof (A) (compound (A)) with a polyalkylene oxide having a hydroxyl group at one terminal thereof or a derivative thereof (B) (compound (B)), at a molar ratio ($B_{HYD}/A_{CAR}$) expressed by the following formula, $$B_{HYD}/A_{CAR}$$

wherein $B_{HYD}$ is a number of moles of hydroxyl groups of the polyalkylene oxide having a hydroxyl group at one terminal thereof or of the derivative thereof, and $A_{CAR}$ is a number of moles of carboxylic acid groups of the ethylene-unsaturated carboxylic acid copolymer or of the derivative thereof, of from 0.3 to 2.5; or in the case of the transesterification reaction, an alkyl ester of the ethylene-unsaturated carboxylic acid copolymer or an alkyl ester derivative thereof (containing neither carboxyl group nor carboxylic anhydride group) is used as the compound (A) and is reacted (transesterification reaction) with the polyalkylene oxide having a hydroxyl group at one terminal thereof or with the derivative thereof (B) so as to satisfy the above molar ratio ($B_{HYD}/A_{CAR}$);

2. The remaining amount of the unreacted carboxylic acid groups in the polymer is not larger than 30 mol % on the basis of the carboxylic acid of the ethylene-unsaturated carboxylic acid copolymer or of the derivative thereof (A); or in the case of the transesterification reaction, the amount of the residual carboxylic acid group is substantially 0 mole %;

3. In forming the ester bond by the esterification reaction, the compound (A) has a composition containing ethylene in an amount of from 50 to 98% by weight, an unsaturated carboxylic acid or an anhydride thereof in an amount of from 2 to 50% by weight, and other monomers in an amount of from 0 to 30% by weight; or in the case of the transesterification reaction, the compound (A) has a composition containing ethylene in an amount of from 50 to 98% by weight, and an alkyl ester of an unsaturated carboxylic acid or an alkyl ester derivative thereof in an amount of from 2 to 50% by weight;

4. The ethylene-unsaturated carboxylic acid copolymer or the derivative thereof (A) is an ionomer of which the carboxylic acid is partially neutralized with a monovalent metal or a multi-valent metal, the neutralization degree being from 0.5 to 60 mole %;

5. The ethylene-unsaturated carboxylic acid copolymer or the derivative thereof (A) has a melt flow rate of from 0.1 to 500 g/10 min. at 190° C. under a load of 2160 g;

6. The polyalkylene oxide having a hydroxyl group at one terminal thereof or the derivative thereof (B) has a number average molecular weight of from 200 to 100,000 and contains the ethylene oxide in an amount of from 30 to 100 mol %;

7. A hydroxyl group at the other terminal of the polyalkylene oxide or of the derivative thereof (B) is blocked by the etherification, esterification or by the reaction with a monoisocyanate;

8. The esterification of the compound (A) with the compound (B) is conducted in the presence of an acid catalyst; or the transesterification of the compound (A) with the compound (B) is conducted in the presence of an organometal catalyst (particularly, a metal alkoxide);

9. The polymer takes the form of a powder, a film or a sheet; and

10. The esterification reaction or the transesterification reaction is conducted in the presence of a crosslinking agent of a small amount (pre-crosslinking), and the polymer has been partially crosslinked.

According to the present invention, the gel-type polymer electrolyte is generally used in a form in which the polymer matrix is impregnated with an electrolytic solution.

In this case, it is desired that:

1. The solvent exists in the electrolytic solution at a ratio of from 30 to 95% by weight, preferably 30 to 90% by weight, on the basis of the sum of said polymer and said electrolytic solution;

2. The electrolyte exists in the electrolytic solution at a ratio of from 1 to 30% by weight on the basis of the sum of said polymer and said electrolytic solution;

3. The electrolyte species in the electrolytic solution is a lithium salt; and

4. The solvent in the electrolytic solution is a nonaqueous electrolytic solvent.

In having the electrolytic solution absorbed, further, the polymer may be blended with a crosslinking agent such as an acrylic derivative to have the electrolytic solution absorbed and to obtain the gel polymer in a form that is crosslinked (after-crosslinking).

According to the present invention, further, there is provided a secondary cell and, particularly, a lithium secondary cell equipped with a layer of the gel-type polymer electrolyte.

According to the present invention, further, there is provided a capacitor equipped with the layer of the gel-type polymer electrolyte.

BRIEF DESCRIPTION OF DRAWINGS

FIGS. 4a and 4b are graphs showing the results of Example 23 (solid line) and results of Comparative Example 5 (broken line), wherein

BEST MODE FOR CARRYING OUT THE INVENTION

In order to solve the above-mentioned problems, the present invention pays attention to polyolefin materials which are chief components of the separator material, but which were not so far regarded as the electrolyte. These materials, however, are not capable of absorbing and holding an organic solvent that is used for the lithium secondary cell.

The present inventors have previously discovered that a diacrylate compound having oligo(oxyethylene) groups at both terminals thereof and grafted with PMMA, exhibits a property of transporting lithium ions, and that compatibility is markedly enhanced between the polymer chain thereof and the electrolytic solution (patent application therefor is pending, Laid-Open Patent Publication No. 189166/2001).

The present inventors have further expanded the discovery, paid attention-to a carboxylic acid-containing polyethylene, i.e., to an ethylene-unsaturated carboxylic acid (inclusive of unsaturated acid anhydride thereof) copolymer as a polyolefin, have succeeded in esterifying it with the carboxylic acid (or acid anhydride thereof) by using a polyethylene oxide having hydroxyl group at one terminal thereof or a derivative thereof to introduce the polyethylene oxide like a comb into the polyethylene side chains relying on the ester bond, i.e., have succeeded in synthesizing a polyethylene unsaturated carboxylic acid copolymer grafted with the polyethylene oxide, and have studied electrolytic properties of the polymer. As a result, the inventors have discovered that the polymer can be easily formed into a self-supported film and exhibits properties for absorbing and holding large amounts of the electrolytic solution used in the lithium ion cells.

The inventors have further discovered that the polymer having properties same as those described above is obtained even when the ester bond is introduced by the transesterification reaction with the polyethylene oxide having a hydroxyl group at one terminal thereof or a derivative thereof by using an alkyl ester of an ethylene-unsaturated carboxylic acid copolymer or an alkyl ester derivative thereof, instead of relying upon the above esterification reaction.

[Polymer Matrix]

The polymer material used for the gel-type polymer electrolyte of the present invention comprises, as a basic constitution, an ethylene-unsaturated carboxylic acid copolymer or a derivative thereof (A) and a polyalkylene oxide having a hydroxyl group at one terminal thereof or a derivative thereof (B), which are bonded (grafted) together by an ester bond.

That is, the polymer material is the one in which the polyalkylene oxide is introduced like a comb into the ethylene-unsaturated carboxylic acid copolymer by the ester bond. Preferably, the polymer material is obtained by esterifying the ethylene-unsaturated carboxylic acid copolymer with the polyalkylene oxide having a hydroxyl group at one terminal thereof. It is, of course, allowable to obtain the polymer material by introducing the polyalkylene oxide (single-terminated alkoxypolyalkylene oxide) by the transesterification reaction by using a derivative of the ethylene-unsaturated carboxylic acid ester copolymer (alkyl ester or alkyl ester derivative).

(1) Ethylene-Unsaturated Carboxylic Acid Copolymer or Derivatives thereof (A)

It is desired that the ethylene-unsaturated carboxylic acid copolymer or the derivative thereof (A) (hereinafter often referred to as compound (A)) has a composition containing an ethylene in an amount of from 50 to 98% by weight and, particularly, from 60 to 95% by weight, an unsaturated carboxylic acid in an amount of from 2 to 50% by weight and, particularly, from 5 to 25% by weight, and other monomers in an amount of from 0 to 30% by weight and, particularly, from 0 to 20% by weight.

When the ethylene content becomes too small in the copolymer, the resin exhibits an increased melting temperature and a decreased melt fluidity, which is not desirable in the esterification reaction with the polyalkylene oxide from the standpoint of temperature that must be elevated and the stirring efficiency.

Examples of the unsaturated carboxylic acid include acrylic acid, methacrylic acid, ethacrylic acid, fumaric acid, maleic acid, itaconic acid, monomethyl maleate, monoethyl maleate, maleic anhydride and itaconic anhydride.

Among them, it is most desired to use acrylic acid or methacrylic acid.

As other monomers that are arbitrarily added for constituting the ethylene-unsaturated carboxylic acid copolymer, there can be exemplified vinyl esters such as vinyl acetate and vinyl propionate; unsaturated carboxylic acid esters such as methyl acrylate, ethyl acrylate, isopropyl acrylate, n-butyl acrylate, isobutyl acrylate, isooctyl acrylate, methyl methacrylate, isobutyl methacrylate, dimethyl maleate and diethyl maleate; as well as carbon monoxide and sulfur dioxide.

In the present invention, the compound (A) used for the transesterification method is an alkyl ester of the ethylene-unsaturated carboxylic acid copolymer or an alkyl ester derivative thereof. Further, the unsaturated carboxylic acid ester or a derivative constituting the compound (A) is the above-mentioned unsaturated carboxylic acid ester or a derivative thereof and, particularly, methyl ester or ethyl ester.

In the present invention, the ethylene-unsaturated carboxylic acid copolymer itself may be used, but it is still also allowable to use a derivative thereof, such as an ionomer in which some carboxyl groups are replaced by a metal salt.

As a metal of a metal salt constituting the ionomer, there can be exemplified a monovalent metal such as lithium, sodium or potassium, or a multi-valent metal such as magnesium, calcium, zinc, copper, cobalt, manganese, lead or iron. Lithium salt is preferably used for the polymer electrolyte material for the polymer lithium cells.

When the ionomer has a too large degree of neutralization, it becomes difficult to obtain a homogeneous composition when the polyalkylene oxide is grafted thereon. It is therefore desired that the ionomer has a degree of neutralization of from 0.5 to 60 mol % and, particularly, a degree of neutralization of as low as from 1 to 30 mol %.

The ethylene-unsaturated carboxylic acid copolymer, according to the present invention, is obtained by the radical copolymerization of an ethylene with an unsaturated carboxylic acid or with other monomers under the conditions of a high temperature and elevated pressure. The metal ionomer is obtained by neutralizing the above copolymer with a metal salt under the conditions that have been known per se.

It is desired that the above ethylene-unsaturated carboxylic acid copolymer or the ionomer thereof has a melt flow rate of from 0.1 to 500 g/10 min. and, particularly, from 0.5 to 300 g/10 min. at 190° C. under a load of 2160 g.

It is desired that the weight average molecular weight (Mw) reckoned as polystyrene molecular weight is from 2,000 to 800,000 and, particularly, from 4,000 to 500,000. The above weight average molecular weight (Mw) corresponds to a number average molecular weight (Mn) of from 500 to 150,000 and, preferably, from 1,000 to 100,000.

In the present invention, further, the ethylene-unsaturated carboxylic acid copolymers or derivatives thereof of two or more kinds may be used being blended together.

(2) Polyalkylene oxide having a hydroxyl Group at One Terminal thereof or Derivatives thereof (B)

The polyalkylene oxide having a hydroxyl group at one terminal thereof (often referred to as compound (B)) has the hydroxyl group at the other end thereof that is blocked and, desirably, has a number average molecular weight of from 200 to 100,000 and contains an ethylene oxide in an amount of 30 to 100 mol %.

As the comonomer, there is used propylene oxide, n-butylene oxide and/or isobutylene oxide, and there can be used an ethylene oxide and a random copolymer thereof, a grafted copolymer thereof or a block copolymer thereof as the compound (B).

It is allowed that the polyalkylene oxide contains the propylene oxide component in an amount of from 0 to 60 mol % and a butylene oxide component in an amount of from 0 to 20 mol %.

From the standpoint of structure, it may be a linear homopolymer of which the one terminal is blocked, a copolymer and a branched grafted product based on a polyhydric alcohol (such as glycerin, pentaerythritol).

In this case, other hydroxyl groups are stoichiometrically blocked such that each molecule has a hydroxyl group. It is also allowable to use, in combination, two or more kinds of the polyalkylene oxides having a hydroxyl group at one terminal thereof.

The hydroxyl group at the other terminal can be blocked by etherification, esterification or by the reaction with a monoisocyanate.

In the case of the etherification, there is used, as a substituent, an alkyl group having 1 to 22 carbon atoms (e.g., ethyl group, hexyl group, 2-ethylhexyl group, etc.), phenyl group and benzyl group.

In the case of the esterification, there is used a carboxylic acid having 1 to 22 carbon atoms (e.g., acetic acid, maleic acid or terephthalic acid) and a carboxylic anhydride (e.g., maleic anhydride).

In blocking the hydroxyl group at one terminal with the monoisocyanate, there is used a methyl isocyanate or a phenyl isocyanate.

To obtain the polymer electrolyte comprising a partially crosslinked polymer according to the present invention, a polyhydric alcohol having two or more hydroxyl groups (e.g., glycerin, pentaerythritol, etc.) may be added as a crosslinking agent (pre-crosslinking) prior to effecting the esterification or the etherification. The amount of addition of the crosslinking agent may differ depending upon the molecular weight of the compound (A) or (B) but is, usually, from 0.1 to 30% by weight and, particularly, from 1 to 15% by weight per the sum of the compounds (A) and (B).

(3) Grafting and Polymer

It is desired that the esterification reaction of the ethylene-unsaturated carboxylic acid copolymer into a carboxylic acid by using the polyalkylene oxide having a hydroxyl group at one terminal thereof (B), is conducted by the bulk reaction without using solvent but using an acid catalyst.

Described below next is the basic operation of the esterification reaction.

First, an acid catalyst is added to the polyalkylene oxide having a hydroxyl group at one terminal thereof or to the derivative thereof (compound (B)) under the heated and stirring conditions, followed by the addition of an ethylene-unsaturated carboxylic acid copolymer or a derivative thereof (compound (A)) to conduct the reaction for several tens of hours.

After the reaction, the reaction product is washed with water and by being immersed in methanol or ethanol to remove unreacted polyalkylene oxide and catalyst, and is dried in vacuum.

It is desired that the compounds (A) and (B) are fed at a molar ratio ($B_{HYD}/A_{CAR}$) expressed by the following formula, $$B_{HYD}/A_{CAR}$$

wherein $B_{HYD}$ is a number of moles of hydroxyl groups of the polyalkylene oxide of having a hydroxyl group at one terminal thereof or of the derivative thereof, and $A_{CAR}$ is a number of moles of carboxylic acid groups of the ethylene-unsaturated carboxylic acid copolymer or of the derivative thereof (here, however, the carboxylic acid group includes not only a carboxyl group but also a carboxylic ester group and a carboxylic anhydride group, the carboxylic anhydride group being calculated as two carboxyl groups), of from 0.3 to 2.5 and, particularly, from 0.9 to 2.0 (the same also holds even in,the case of the transesterification).

It is desired that the reaction temperature is from 80 to 160° C. and, particularly, from 100 to 140° C.

Desirably, the reaction time is from 7 to 40 hours and, particularly, from 10 to 30 hours.

The acid catalyst for the esterification is desirably sulfuric acid, phosphoric acid, polyphosphoric acid, paratoluenesulfonic acid, benzenesulfonic acid, xylenesulfonic acid or dodecylbenzenesulfonic acid, and the amount of addition is from 0.0001 to 0.1 mole and, particularly, from 0.001 to 0.05 moles per mole of the hydroxyl group.

When the transesterification reaction is to be conducted, there can be used, as a catalyst, for example, a metal alkoxide (sodium methoxide, potassium ethoxide, rare earth triisopropoxide, potassium t-butoxide, titanium tetrabutoxide, dibutyltin oxide, etc.), a sodium hydroxide, a potassium hydroxide or a heteropoly-acid (molybdo-phosphoric acid, tungstophosphoric acid, etc.). The amount of addition is preferably from 0.0001 to 0.5 mols and, particularly, from 0.001 to 0.1 mol per mole of the hydroxyl groups.

The reaction system is maintained under a reduced pressure (e.g., 0.067 MPa=500 mmHg) to efficiently carry out the esterification reaction.

In this esterification reaction, it is also allowable to use an organic solvent (e.g., toluene, xylene, ethylene or glycol diethyl ether) and an antioxidizing agent (e.g., hydroquinone, hydroquinone monomethyl ether). The same also holds for the transesterification reaction.

It is desired that the amount of addition of the antioxidizing agent is from 100 to 10,000 ppm and, particularly, from 500 to 5,000 ppm with respect to the compound (B).

The polymer material used in the present invention is melted alone at a high temperature or is melted at a high temperature in combination with a nonvolatile organic solvent, and is molded into a self-supported film or sheet by means that has been known per se. such as casting method, T-die method or inflation method.

[Gel-Type Polymer Electrolyte]

The gel-type polymer electrolyte of the present invention comprises a matrix of the above polymer and an electrolytic solution with which the matrix is impregnated.

In the gel-type polymer electrolyte of the present invention, it is desired that the solvent exists in the electrolytic solution in an amount of, usually, from 30 to 95% by weight and, particularly, preferably from 30 to 90% by weight, especially preferably from 60 to 90% by weight on the basis of the sum of the polymer and the electrolytic solution. When the amount of the solvent is too small, the ionic conductivity decreases. When the amount of the solvent is too large, the strength of the electrolyte tends to decrease.

It is further desired that the electrolyte exists in the electrolytic solution in an amount of, usually, from 1 to 30% by weight and, particularly, from 1 to 20% by weight on the basis of the sum of the polymer and the electrolytic solution. When the amount of the electrolyte is larger or is smaller than the above range, the ionic conductivity tends to decrease.

The present invention uses any electrolyte salt that is usually used for the gel-type polymer electrolytes of this kind.

When the polymer electrolyte of the invention is used for the lithium polymer secondary cell, there is preferably used a lithium salt such as $CF_3SO_3Li$, $C_4F_6SO_3Li$, $(CF_3SO_2)_2NLi$, $(CF_3SO_2)_3CLi$, $LiBF_4$, $LiPF_6$, $LiClO_4$ or $LiAsF_6$ as an electrolytic salt, to which only, however, the invention is in no way limited.

As the non-aqueous electrolytic solvent (organic solvent), there can be used any non-aqueous solvent that is usually used for the gel-type polymer electrolyte of this type. For example, there can be used at least any one solvent selected from the group consisting of cyclic carbonates such as ethylene carbonate and propylene carbonate; dipropyl carbonates such as dimethyl carbonate, methyl ethyl carbonate, diethyl carbonate and dipropyl carbonate; cyclic esters such as γ-butyrolactone and propiolactone; chain-like ethers such as diethoxyethane and dimethoxyethane; amide compounds such as dimethylacetamide, etc.; nitrile compounds such as acetonitrile, propionitrile, etc.; N-methylpyrrolidione, etc.; and mixture solutions thereof. The invention, however, is in no way limited to these examples only, as a matter of course.

In the present invention, the electrolytes and the non-aqueous solvents are in no way limited to the above-mentioned examples only.

For example, when the polymer electrolyte of the present invention is used for the capacitor, there is used, as the electrolyte, a salt in which lithium of the above lithium salt is substituted by other alkali metal ion (sodium ion, potassium ion, cesium ion or the like ion), an ammonium salt such as tetraalkylammonium, a tetraalkylfluoroborate $((C_2H_5)_4NBF_4$, etc), a tetraalkylphosphonium fluoroborate $((C_2H_5)_4PBF_4$, etc), a tetraalkylphosphonium trifluorosulfonate $((C_2H_5)_4PCF_3SO_3$, etc), an alkylpyridinium salt and an N-alkylimidazole salt.

As the non-aqueous solvent in this case, there is preferably used an organic solvent having a donor number of not smaller than 0.1 and a dielectric constant of not smaller than 10.0. Examples of such an organic solvent include acid anhydrides such as acetic anhydride; amide compounds such as dimethylformamide and dimethyl sulfoxide; phosphate compounds such as trimethyl phosphate and tributyl phosphate; and amine compounds such as hydrazine, ethylenediamine, ethylamine and triethylamine, in addition to the above-mentioned solvents for the secondary cells.

In the present invention; the polymer is molded into a film or a sheet, and the polymer is impregnated with the electrolytic solution in to any order.

For example, the film or the sheet of the polymer prepared through the above-mentioned means is immersed in a solution containing the above-mentioned electrolyte salt to obtain a polymer-electrolyte. At this moment, the temperature of the electrolytic solution is controlled to change the rate of impregnation.

It is desired that the polymer electrolyte of the present invention is obtained by impregnating a thin polymer film that has been synthesized in advance with the electrolytic solution. According to another method, the above-mentioned polymer material and the above-mentioned electrolytic solution are mixed together, and are heated up to more than 80° C. to obtain a molten solution thereof, which is then casted into a sheet to use it as the polymer electrolyte.

For example, a solution of an N-methylpyrrolidione containing 1 mole/L of a lithium tetrafluoroborate using, as a solvent, a chain-like carbonate such as dimethyl carbonate, and the above-mentioned polymer material are mixed together at a weight ratio of (1.5 to 3.5):1, and are heated up to more than 80° C. to obtain a transparent solution. This solution is casted onto the polyethylene terephthalate film and is pressurized to obtain an electrolyte film having a predetermined thickness.

In mixing and heating the above polymer material and the electrolytic solution to prepare a molten solution in the present invention, further, it is further allowable to add a crosslinking agent as is widely done even in the polyethylene oxide polymers to promote gelling and to increase the mechanical strength [Reference literature: Industrial Materials, 47(2), 18 (1999) and Yuasa Jiho No. 87, Oct. 4 (1999)]. For example, the polymer material of the present invention may be blended with a diacrylate compound having an oligo (oxyethylene) group at both terminals, and is dissolved together with the electrolytic solution to carry out the thermal polymerization (after-crosslinking). Further, the polymer material of the present invention has a polyethylene chain. Therefore, the electron-beam (EB) crosslinking and the UV crosslinking that are usually conducted for crosslinking the gel polymer electrolytes, can also be applied to the polymer electrolyte of the present invention.

(Use)

The gel-type polymer electrolyte of the present invention is useful as a solid electrolyte layer for the secondary cells such as lithium secondary cells and as a solid electrolyte layer for the capacitors.

There is no particular limitation on the structure of these secondary cells or the capacitors if they are provided with a layer of the gel-type polymer electrolyte of the present invention.

In the case of the lithium secondary cells, it is desired to interpose a thin layer of the gel-type polymer electrolyte of the present invention between the lithium metal negative electrode and the positive electrode active substance (e.g., $LiCoO_2$).

The gel-type polymer electrolyte of the present invention has a thickness of, generally, from 1 μm to 1 mm and, particularly, from 5 μm to 0.3 mm, and can be laminated as a layer in the secondary cells or in the capacitors.

The secondary cell of the present invention can be modified in a variety of ways as a matter of course.

In the liquid electrolyte-type lithium ion cells, for example, a porous film of polyolefin such as polyethylene is used as a separator and is imparted with a function for cutting off the electric current by utilizing the melting property of the polyethylene when heated.

The separator film is prepared by blending the polyethylene with the polypropylene, or is formed of a film obtained by laminating the polyethylene and the polypropylene one upon the other. Therefore, the separator film favorably melts together with the polymer material of the present invention. By adhering the above-mentioned electrolyte film on one surface or on both surfaces of the separator, or by applying a molten solution of the polymer electrolyte onto one surface or both surfaces of the separator to use them as a laminated film, there is obtained a film having a separator function and an electrolytic function.

In recent years, further, there has been produced, as a separator, a film of a three-layer structure by arranging a fine porous film of polyethylene between the two fine porous films of polypropylene. By mixing the polymer material of the present invention into the polyethylene layer or by applying the polymer material of the invention onto one surface or two surfaces of the polyethylene layer, there can be obtained a polymer electrolyte film having a separator function and stably holding the electrolytic solution therein.

Instead of using the separator, further, the polymer material may be directly applied to one electrode followed by after-crosslinking so as to be sandwiched by the other electrode.

Various surface-reforming technologies (chemical modification technologies) can be applied to the surfaces of the polymer material of the present invention to improve the property for retaining electrolytic solution, and to improve adhesiveness to the surface of the negative electrode material, to the surface of the positive electrode material and to the surface of the separator. Besides, a chemical modification technology can be employed for the polymer electrolyte itself. In particular, the surfaces of the film or the polymer electrolyte itself can be reformed by applying a thermally or optically crosslinking agent onto the surface of the film of the invention or by mixing the thermally or optically crosslinking agent at the time of dissolving the electrolyte in connection with the after-crosslinking followed by the irradiation with heat or light. It is further allowable to reform the surfaces by the irradiation with an electron beam (EB). By effecting the pre-crosslinking as described above, further, it is allowed to omit or simplify the step of after-crosslinking.

EXAMPLES

The invention will be further described by way of working examples which, however, are in no way to limit the present invention.

Preparation Example 1

183 Gram of a polyethylene glycol monomethyl ether PEG-MME (number average molecular weight of 550, 0.33 mol of hydroxyl groups) and 1.5 g (0.0079 mol) of a hydrate of paratoluenesulfonic acid (molecular weight of 190) were introduced into a 500-ml four neck flask.

The mixture was heated up to 140° C. with stirring, and, while blowing nitrogen (0.1 m³/hr) through a capillary tube, 100 g of an ethylene-acrylic acid copolymer (0.28 mol of carboxylic acid group, molar ratio ($B_{HYD}/A_{CAR}$) of hydroxyl group/carboxylic acid group=1.18) was gradually added while confirming the dissolving state (over about 30 minutes). After the addition has been finished, the mixture was reacted at the same temperature for 24 hours.

After the reaction, the reaction product was taken out into another container and, after cooled, was cut into a size of about 1 cm³. 500 ml of ethanol was added thereto at room temperature. After immersed for 70 hours, the ethanol solution was removed by decantation.

Another 500 ml of ethanol was added thereto, and the same operation was repeated. After washed in ethanol, the esterified product was taken out and was dried in a vacuum drier.

Observation of FTIR spectrum of the obtained esterified product indicated almost no absorption peak ($vCO=1700$ cm$^{-1}$) due to the carbonyl group of the unreacted free carboxylic acid.

The obtained esterified product was regarded to be a polymer electrolyte material A.

Composition of the polymer electrolyte material A (% by weight): E/AA/PEG-MME=31.5/0.0/68.5 (E: ethylene AA: acrylic acid)

Preparation Example 2

154 Gram of the polyethylene glycol monomethyl ether PEG-MME (number average molecular weight of 550, 0.28 mol of hydroxyl group) and 1.28 g (0.0067 mol) of a hydrate of paratoluenesulfonic acid were introduced into a 500-ml four neck flask. The mixture was heated up to 140° C. with stirring, and 100 g of an ethylene-acrylic acid copolymer (0.28 mol of carboxylic acid, $B_{HYD}/A_{CAR}=1.00$) was gradually added.

Then, the operation same as that of preparation Example 1 was repeated but changing the reaction time from 24 hours into 16 hours.

Observation of FTIR spectrum of the esterified product indicated, as a shoulder, an absorption peak ($vCO=1700$ cm$^{-1}$) due to the carbonyl group of the unreacted free carboxylic acid.

Due to the titration with KOH, there remained 5 mol % of carboxylic acid of ethylene-acrylic acid copolymer (0.014 mol in 0.28 mol of carboxylic acid).

The titration with KOH was conducted by heating and dissolving 5 g of the sample in 200 g of a solution of toluene/ethanol=¼, and effecting the titration in a 0.1 N KOH aqueous solution by using a phenolpthalein indicator.

The obtained product was regarded to be a polymer electrolyte material B.

Composition of the polymer electrolyte material B (% by weight): E/AA/PEG-MME=32.5/0.4/67.1

Preparation Example 3

123 Gram of the polyethylene glycol monomethyl ether PEG-MME (number average molecular weight of 550, 0.224 mols of hydroxyl group) and 1.02 g. (0.0054 mol) of a hydrate of paratoluenesulfonic acid were introduced into a 500-ml four neck flask. The mixture was heated up to 140° C. with stirring, and 100 g of an ethylene-acrylic acid copolymer (0.28 mols of carboxylic acid, $B_{HYD}/A_{CAR}$=0.8) was gradually added. The operation same as that of preparation Example 1 was repeated but changing the reaction time from 24 hours into 16 hours.

Observation of FTIR spectrum of the esterified product indicated, as a shoulder, an absorption peak ($vCO$=1700 cm$^{-1}$) due to the carbonyl group of the unreacted free carboxylic acid.

Due to the titration with KOH, there remained 24 mol % of carboxylic acid of ethylene-acrylic acid copolymer (0.067 mols in 0.28 mols of carboxylic acid).

The obtained product was regarded to be a polymer electrolyte material C.

Composition of the polymer electrolyte material C (% by weight): E/AA/PEG-MME=36.8/2.2/61.0

Preparation Example 4

248 Gram of a polyethylene glycol monomethyl ether PEG-MME (number average molecular weight of 750, 0.33 mol of hydroxyl groups) and 1.5 g (0.0079 mol) of a hydrate of paratoluenesulfonic acid (molecular weight of 190) were introduced into a 500-ml four neck flask. The mixture was heated up to 140° C. with stirring, and, while blowing nitrogen (0.1 m$^3$/hr) through a capillary tube, 100 g of an ethylene-acrylic acid copolymer (0.28 mols of carboxylic acid, $B_{HYD}/A_{CAR}$=1.18) was gradually added while confirming the dissolving state (over about 30 minutes). After the addition has been finished, the mixture was reacted at the same temperature for 24 hours.

After the reaction, the reaction product was taken out into another container and, after cooled, was cut into a size of about 1 cm$^3$. 500 ml of ethanol was added thereto at room temperature. After immersed for 70 hours, the ethanol solution was removed by decantation. Another 500 ml of ethanol was added thereto, and the same operation was repeated. After immersed in ethanol, the esterified product was taken out and was dried in a vacuum drier.

Observation of FTIR spectrum of the obtained product indicated almost no absorption peak ($vCO$=1700 cm$^{-1}$) due to the carbonyl group of the unreacted free carboxylic acid.

The esterified product was regarded to be a polymer electrolyte material D.

Composition of the polymer electrolyte material D (% by weight): E/AA/PEG-MME=32.3/0.0/67.7

Preparation Example 5

277 Gram of a polyethylene glycol-block-polypropylene glycol mono-2-methylhexyl ether (PEG-b-PPG-MEHE) (number average molecular weight of 840, polyethylene glycol of 50% by weight, 0.33 mol of hydroxyl group) and 0.63 g (0.0033 mols) of a hydrate of paratoluenesulfonic acid (molecular weight of 190) were introduced into a 500-ml four neck flask. The mixture was heated up to 140° C. with stirring, and, while blowing nitrogen (0.1 m$^3$/hr) through a capillary tube, 100 g of an ethylene-acrylic acid copolymer (0.28 mol of carboxylic acid group, $B_{HYD}/A_{CAR}$=1.18) was gradually added. After the addition has been finished, the mixture was reacted at the same temperature for 30 hours. After the reaction, the reaction product was taken out into another container and, after cooled, was cut into a size of about 1 cm$^3$. 500 ml of ethanol was added thereto at room temperature. After immersed for 48 hours, the ethanol solution was removed by decantation.

Another 500 ml of ethanol was added thereto, and the same operation was repeated. After immersed in ethanol, the esterified product was taken out and was dried in a vacuum drier.

Observation of FTIR spectrum of the obtained esterified product indicated almost no absorption peak ($vCO$=1700 cm$^{-1}$) due to the carbonyl group of the unreacted free carboxylic acid.

The obtained esterified product was regarded to be a polymer electrolyte material E.

Composition of the polymer electrolyte material E (% by weight): E/AA/PEG-b-PPG-MEHE=23.9/0.0/76.1

Table 1 shows the composition ratios (% by weight) of the polymer electrolyte materials A to E prepared in Preparation Examples 1 to 5.

TABLE 1

|  | Polymer | Ethylene | Acrylic acid | PEG-MME | PEG-b-PPG-MEHE |
|---|---|---|---|---|---|
| Prep Ex. 1 | A | 31.5 | 0.0 | 68.5 | — |
| Prep Ex. 2 | B | 32.5 | 0.4 | 67.1 | — |
| Prep Ex. 3 | C | 36.8 | 2.2 | 61.0 | — |
| Prep Ex. 4 | D | 32.3 | 0.0 | 67.7 | — |
| Prep Ex. 5 | E | 23.9 | 0.0 | — | 76.1 |

Preparation Example 6

Transesterification

154 Gram of a polyethylene glycol monomethyl ether (PEG-MME) (number average molecular weight of 550, 0.28 mol of hydroxyl group), 1.90 g (0.028 mol) of a sodium ethoxide (catalyst) and 50 g of a xylene (solvent) were introduced into a 500-ml four neck flask. The mixture was heated up to 140° C. with stirring, and, while blowing nitrogen (0.1 m$^3$/hr) through a capillary tube, 56 g of an ethylene-ethyl acrylate copolymer (ethyl acrylate, 25% by weight; melt index, 250 g/10 min; ethyl acrylate, 0.14 mols; $B_{HYD}/A_{CAR}$=2.0) was gradually added thereto (over a time of 15 minutes).

After the addition has been finished, a pipe for cooling the solvent and for lapping was attached, and the reaction was conducted at the same temperature for 30 hours while blowing nitrogen through a capillary tube. When the temperature has dropped down to not higher than 100° C. after the reaction, the reaction mixture was added dropwise to another container containing 1000 ml of water while stirring the reaction mixture to obtain a slurry. After the dropwise addition has been finished, the slurry was stirred for about one hour and was, then, left to stand still. A granular solid was separated by decantation and was introduced into a container containing 500 ml of methanol, stirred for 2 hours and was, then, left to stand still. The mixture was filtered and washed with methanol again to repeat the same operation. After immersed in methanol, the transesterified product was taken out and was dried in a vacuum drier.

From the ratio of FTIR spectral absorbence of the obtained product (grafted PEG-MME carboxylic acid ester, ν=1731 cm$^{-1}$) and the polyethylene (ν=720 cm$^{-1}$) of the internal reference, the transesterification ratio was 89%.

The esterified product was regarded to be a polymer electrolyte material F.

Preparation Example 7

Partially Crosslinked Polymer Material

193 Gram of a polyethylene glycol monomethyl ether (PEG-MME) (number average molecular weight of 550, 0.35 mol of hydroxyl group), 3.0 g (0.0058 mol) of a polyethylene glycol diacrylate (ethylene oxide recurring unit n=9, molecular weight of 520) and 1.5 g (0.0079 mole) of a hydrate of paratoluenesulfonic acid (molecular weight of 190) were introduced into a 500-ml four neck flask.

The mixture was heated up to 140° C. with stirring, and, while blowing nitrogen (0.1 m$^3$/hr) through a capillary tube, 63 g of an ethylene-acrylic acid copolymer (0.18 mol of carboxylic acid group, $B_{HYD}/A_{CAR}$=2.0) was gradually added thereto (over a time of about 20 minutes) while confirming the dissolving state. After the addition has been finished, the mixture was reacted at the same temperature for 24 hours.

After the reaction, the reaction mixture was added dropwise to another container containing 1000 ml of water with stirring. After cooled, the precipitate was filtered by using a filtering cloth, and to which 1000 ml of ethanol was added at room temperature, and then the precipitate was immersed therein for 20 hours. The ethanol solution was then removed by decantation.

Another 500 ml of ethanol was added thereto, and the same operation was repeated. After immersed and washed in ethanol, the partially crosslinked and esterified product was taken out and was dried in a vacuum drier.

The obtained product was regarded to be a polymer electrolyte material G.

To 10 g of the polymer electrolyte material was added 90 g of a mixture solution of a propylene carbonate (PC) and an ethylene carbonate (EC);

PC:EC=1:1 (weight ratio), containing 1 mol/L of LiPF$_6$, and the mixture was heated at 80° C. for 3 hours so as to be homogeneously dissolved, and was cooled down to room temperature to obtain a gel-like polymer electrolyte containing an electrolyte.

Figure 1:
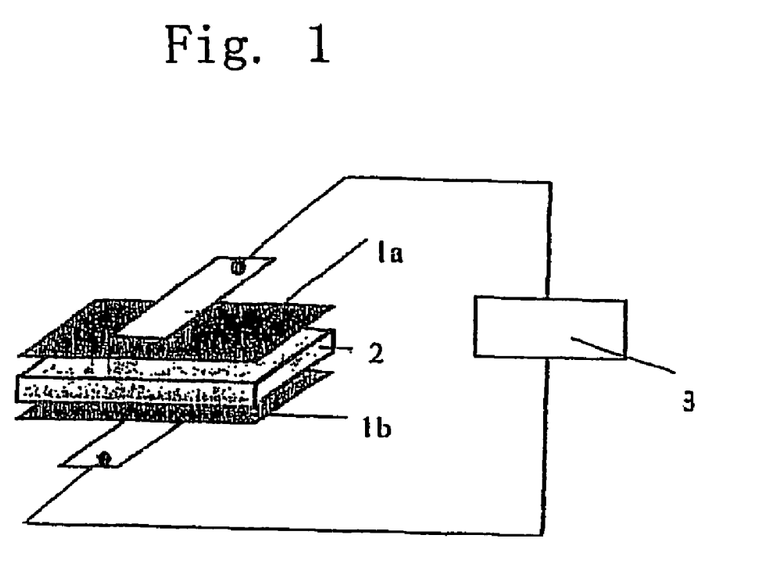
FIG. 1 is a perspective view of a test cell for measuring the ionic conductivity and lithium ion transport number of the polymer electrolytes.

FIG. 1 illustrates a measuring system used for measuring the ionic conductivity and the lithium ion transport number of the polymer electrolyte in the working examples described below. FIG. 1 shows the structure of a measuring cell and a connection between the cell and the measuring equipment.

The measuring cell has a constitution in which a predetermined polymer electrolyte (2) is inserted between the two pieces of lithium metal foils (1a, 1b) having a thickness of 0.2 mm and an electrode area of 2.0×2.0 cm$^2$. Nickel foils are inserted among the glass plate and the lithium metal foils to accomplish an electric connection. The measuring device (3) is a potentio/galvanostat electrolytic device (Model 1287 manufactured by Solatron Co.).

The impedance is measured by connecting a frequency response analyzer (Model 1250 manufactured by Solatron Co.) to the electrolytic device.

Figure 2:
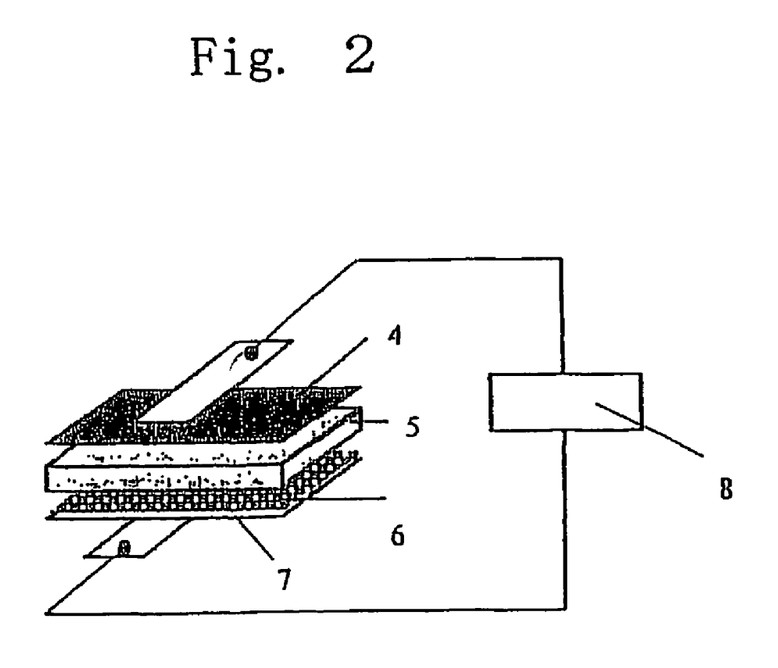
FIG. 2 is a perspective view of a test cell for testing the charge/discharge characteristics.

FIG. 2 illustrates a measuring system used for measuring the charging/discharging characteristics of a lithium secondary cell using a predetermined polymer electrolyte. FIG. 2 shows the structure of a measurement cell and a connection between-the cell and the measurement equipment.

The measuring cell has a constitution in which a predetermined polymer gel electrolyte (5) is inserted between the lithium metal negative electrode and the positive electrode formed by applying a lithium cobaltate (6) which is a positive electrode active substance onto both surfaces of an aluminum foil in an amount of 327.0 g/m$^2$, the aluminum foil having a thickness of 20 μm and an electrode area of 2.0×2.0 cm$^2$. Nickel foils (4, 7) are inserted among the glass plate and the electrodes to accomplish an electric connection. The measuring device (8) is BS-2500 manufactured by Keisoku Giken.

Examples 1 to 6

<Electrolyte-Absorbing Property of Polymer>

The polymer electrolyte material of the present invention obtained in Preparation Example 1 was immersed in a predetermined electrolytic solution at room temperature (25° C.) for two days. The weight of the polymer gel (polymer+electrolytic solution) was measured before and after the immersion to find the absorbed amount of the electrolytic solution. The results were as shown in Table 2.

TABLE 2

Polymer electrolyte material A.

| | Electrolyte solution | Supporting salt | Polymer: Electrolyte (weight ratio) |
|---|---|---|---|
| Ex. 1 | dimethyl carbonate | 1M LiBF$_4$ | 37:63 |
| Ex. 2 | diethyl carbonate | same as above | 58:42 |
| Ex. 3 | dimethoxyethane | same as above | 24:76 |
| Ex. 4 | propylene carbonate + ethylene carbonate | same as above | 30:70 |
| Ex. 5 | γ-Butylolactone | same as above | 32:68 |
| Ex. 6 | N-methylpyrrolidione | same as above | 46:54 |

Example 7

<Swelling Property of Polymer Gel>

The polymer electrolyte material A of the present invention was immersed in a mixture solution of the propylene carbonate and the ethylene carbonate (PC:EC=1:1, containing 1 mol/L of LiPF$_6$) used in Preparation Example 7, heated at 80° C. for 3 hours, and the temperature was then lowered down to room temperature to measure the mass of the polymer gel with the passage of the time. After immersed for 3 hours, swelling of the polymer gel has terminated. At this moment, the solution was contained in an amount of 83.5% by weight, and there was obtained the polymer electrolyte holding the electrolyte in a sufficiently large amount. In this case, the 100 μm-thick film acquired the thickness of 200 to 250 μm after having been impregnated with the polymer electrolyte, which was an increase of 2 to 2.5 times.

Example 8

<Swelling Property of Polymer Gel>

The polymer electrolyte material A of the present invention was immersed in a mixture solution (the one used in Example 7 above) of the propylene carbonate and the ethylene carbonate at room temperature, and the mass of the polymer gel was measured with the passage of the time. After immersed for 3 hours, swelling of the polymer gel has terminated. At this moment, the solution was contained in an amount of 61.3% by weight.

Example 9

<Swelling Property of Polymer Gel>

The polymer electrolyte material A of the present invention was immersed in a mixture solution of an ethylene carbonate (EC) and a dimethyl carbonate (DMC) [EC:DMC=1:2 (weight ratio), containing 1 mol/L of $LiPF_6$], heated at 80° C. for 3 hours, and the temperature was then lowered down to room temperature to measure the mass of the polymer gel with the passage of the time. After immersed for 3 hours, swelling of the polymer gel has terminated. At this moment, the solution was contained in an amount of 88.6% by weight. Thus, there was obtained a polymer electrolyte holding the electrolyte in a sufficiently large amount.

Example 10

<Swelling Property of Polymer Gel>

Figure 3:
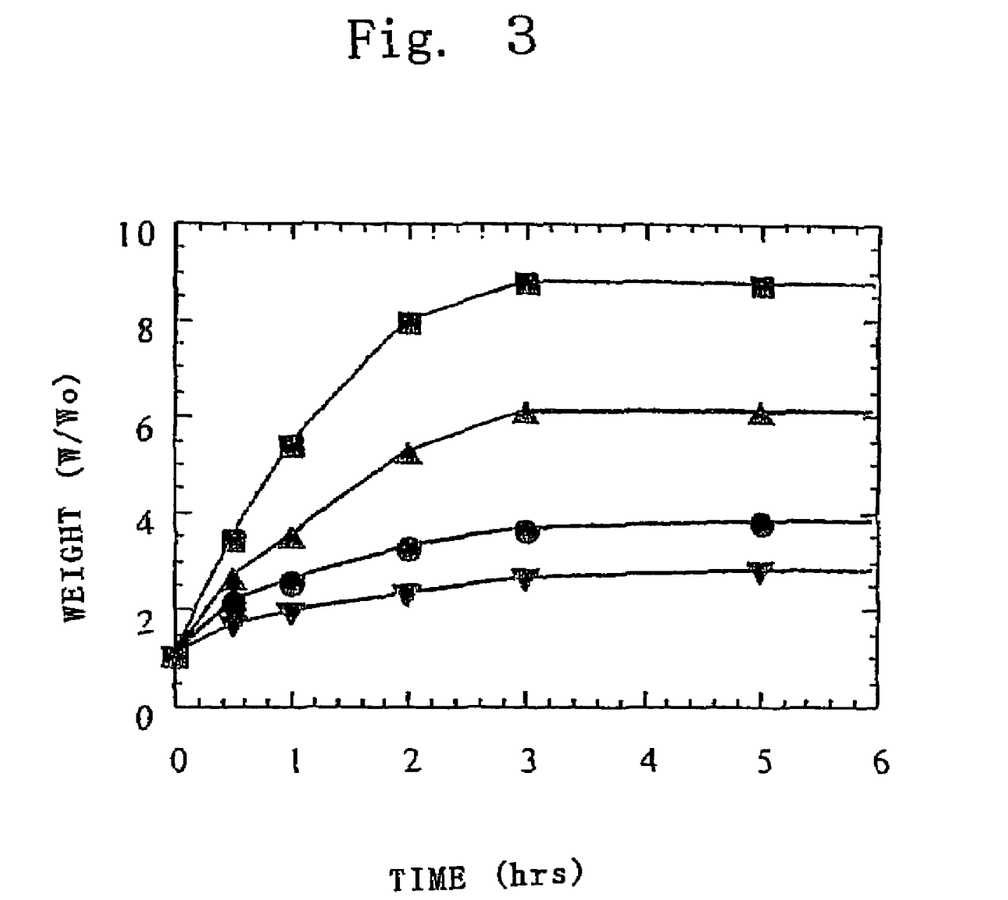
FIG. 3 is a graph showing the results of Example 1, i.e., showing changes in the weight of the polymers immersed in the electrolytic solution with the passage of time (Wo is the weight of the polymer only, and W is the weight of the polymer gel at that time)

The polymer electrolyte material A of the present invention was immersed in a mixture solution of the ethylene carbonate and the dimethyl carbonate used in Example 9 at room temperature, and the mass of the polymer gel was measured with the passage of the time. After immersed for 3 hours, swelling of the polymer gel has terminated. At this moment, the solution was contained in an amount of 72.4% by weight. The results of Examples 7, 8, 9 and 10 were as shown in FIG. 3 and in Table 3.

TABLE 3

| Ex. No. | Polymer | Electrolyte solution | Immersion temp | Content of electrolyte after 3 hours of immersion | Signs of FIG. 3 |
|---|---|---|---|---|---|
| 7 | A | 1M $LiPF_6$ PC + EC(1:1) | 80° C.(3 hr) | 83.5% by wt. | ▲ |
| 8 | A | 1M $LiPF_6$ PC + EC(1:1) | 25° C. | 61.3% by wt. | ▼ |
| 9 | A | 1M $LiPF_6$ PC + DMC(1:2) | 80° C.(3 hr) | 88.6% by wt. | ■ |
| 10 | A | 1M $LiPF_6$ PC + DMC(1:2) | 25° C. | 72.4% by wt. | ● |

Examples 11 to 14

<Ionic Conductivity and Lithium ion Transport Number—Depending upon the Electrolytes>

The polymer electrolyte material A of the present invention and the polymer electrolytes of various electrolytic solutions were measured for their ionic conductivities and lithium ion transport numbers at room temperature (25° C.). These polymer electrolytes exhibited ionic conductivities above $1 \times 10^{-3}$ S cm$^{-1}$ and lithium ion transport numbers of about 0.2, which were favorable properties as electrolytes.

The results were as shown in Table 4. The ionic conductivities and the lithium ion transport numbers of the polymer electrolytes were calculated in accordance with the following formulas.

Ionic conductivity=bulk resistance/distance between electrodes (thickness of polymer electrolyte)

Lithium ion transport number=$I_s(dV-I_0Re^0)/I_0(dV-I_sRe^s)$ $I_0 = dV/(Re^0 + Rb^0)$ $I_0$: current before the constant-voltage electrolysis
$Re^0$: interfacial resistance before the constant-voltage electrolysis
$Rb^0$: bulk resistance before the constant-voltage electrolysis
$I_s$: current after the constant-voltage electrolysis
$Re^s$: interfacial resistance after the constant-voltage electrolysis
dV: voltage applied for electrolysis

TABLE 4

| | Supporting salt | Solvent | Ionic conductivity | Li ion transport number |
|---|---|---|---|---|
| Ex. 11 | 1M $LiBF_4$ | PC + EC(1:1) | $1.7 \times 10^{-3}$ S/cm | 0.14 |
| Ex. 12 | 1M $LiBF_4$ | EC + DMC(1:2) | $1.4 \times 10^{-3}$ S/cm | 0.17 |
| Ex. 13 | 1M $LiPF_6$ | PC + EC(1:1) | $1.5 \times 10^{-3}$ S/cm | 0.12 |
| Ex. 14 | 1M $LiPF_6$ | EC + DMC(1:2) | $5.2 \times 10^{-3}$ S/cm | 0.09 | note:
$10^{-3}$ means exp.−3.

Examples 15 to 20

<Ionic Conductivity and Lithium ion Transport Number—Depending upon the Kind of Polymers>

For polymer electrolytes obtained by impregnating the polymer electrolyte materials B to G obtained in Preparation Examples 2 to 7 with a mixture solution of a propylene carbonate and an ethylene carbonate (PC:EC=1:1, weight ratio, and containing 1 mol/L of $LiBF_4$), their ionic conductivities and lithium ion transport numbers at room temperature were measured. These polymer electrolytes exhibited ionic conductivities above $1 \times 10^{-3}$ S cm$^{-1}$ and lithium ion transport numbers of about 0.2, which were favorable properties as polymer electrolytes. The results were as shown in Table 5.

TABLE 5

| | Polymer | Electrolyte solution | Ionic conductivity | Li ion transport number |
|---|---|---|---|---|
| Ex. 15 | B | 1M $LiBF_4$ PC + EC(1:1) | $1.5 \times 10^{-3}$ S/cm | 0.20 |
| Ex. 16 | C | 1M $LiBF_4$ PC + EC(1:1) | $1.4 \times 10^{-3}$ S/cm | 0.20 |
| Ex. 17 | D | 1M $LiBF_4$ PC + EC(1:1) | $1.5 \times 10^{-3}$ S/cm | 0.19 |
| Ex. 18 | E | 1M $LiBF_4$ PC + EC(1:1) | $7.8 \times 10^{-3}$ S/cm | 0.08 |
| Ex. 19 | F | 1M $LiBF_4$ PC + EC(1:1) | $1.2 \times 10^{-3}$ S/cm | 0.20 |
| EX. 20 | G | 1M $LiBF_4$ PC + EC(1:1) | $2.9 \times 10^{-3}$ S/cm | 0.18 |

Comparative Examples 1 to 4

<Ionic Conductivity and Lithium ion Transport Number—Depending upon the Kind of Polymers>

For the polymer electrolytes obtained by impregnating a polyvinylidene fluoride/hexafluoropropylene copolymer (abbreviated as P(VDF-HFP) and manufactured by Aldrich Co.) with mixture solutions of propylene carbonate and ethylene carbonate used in Examples 15 to 18, for their ionic conductivities and lithium ion transport numbers at room temperature were measured. The results were as shown in Table 6.

TABLE 6

| Comp. Ex. No. | Polymer | Content of electrolyte solution | Supporting salt | Ionic Conductivity | Li ion transport number |
|---|---|---|---|---|---|
| 1 | P(VDF-HFP) | 70% | 1M LiBF$_4$ PC + EC(1:1) | $1.7 \times 10^{-3}$ S/cm | 0.20 |
| 2 | P(VDF-HFP) | 65% | 1M LiBF$_4$ PC + EC(1:1) | $1.5 \times 10^{-3}$ S/cm | 0.20 |
| 3 | P(VDF-HFP) | 60% | 1M LiBF$_4$ PC + EC(1:1) | $1.3 \times 10^{-3}$ S/cm | 0.21 |
| 4 | P(VDF-HFP) | 50% | 1M LiBF$_4$ PC + EC(1:1) | $0.7 \times 10^{-3}$ S/cm | 0.22 |

From Examples 15 to 20 and Comparative Examples 1 to 4, it was demonstrated that the polymer materials of the present invention possessed the properties comparable to those of the PVDF polymer electrolyte.

Examples 21 to 23

<Ionic Conductivities—Temperature Dependence>

For the polymer electrolytes obtained by impregnating the polymer electrolyte materials B to D of the present invention with a mixture solution of the propylene carbonate and the ethylene carbonate used in Example 15, their ionic conductivities at temperatures of −20, −10, 0, 10, 25, 40, 55, 70 and 85° C. were measured. All of these polymer gel electrolytes exhibited ionic conductivities above $1 \times 10^{-3}$ S cm$^{-1}$ at temperatures above 10° C. It was thus demonstrated that favorable ionic conductivities were obtained even at low temperatures. The results were as shown in Table 7.

TABLE 7

| | | Ionic conductivity (mS/cm) | | | | | | | | |
|---|---|---|---|---|---|---|---|---|---|---|
| | Polymer | −20° C. | −10° C. | 0° C. | 10° C. | 25° C. | 40° C. | 55° C. | 70° C. | 85° C. |
| Ex. 21 | B | 0.40 | 0.49 | 0.70 | 1.03 | 1.53 | 2.09 | 2.79 | 3.36 | 4.34 |
| Ex. 22 | C | 0.47 | 0.54 | 0.82 | 1.13 | 1.69 | 2.26 | 2.73 | 3.73 | 5.17 |
| Ex. 23 | D | 0.36 | 0.43 | 0.66 | 0.93 | 1.38 | 1.93 | 2.69 | 3.73 | 4.29 |

Example 24

<Effect for Suppressing the Formation of Dendrite>

The electrolysis was conducted at a constant current of 3 mA/cm$^2$ for one hour and, then, the interface between lithium and the polymer electrolyte was observed by using a CCD camera. The surface of the lithium metal electrode was smooth, and it was learned that the polymer electrolyte of Example 15 suppressed dendrite formation to a conspicuous degree on the interface of the lithium electrode.

Example 25

<Charge/Discharge Cycle Characteristics>

A test cell was fabricated by using lithium cobaltate applied onto an aluminum collector as a positive electrode, a lithium metal as a negative electrode and the polymer electrolyte material B of Example 15, and was subjected to the charging/discharging testing at 20° C.

The cell was electrically charged in a CC mode at a current density of 1.025 mA/4 cm$^2$ while setting the cut-off voltage to be 4.3 V, and was discharged at a current density of 1.025 mA/4 cm$^2$ while setting the cut-off voltage to be 2.5 V. The secondary cell produced an output voltage of as high as 3.8 to 4.0 V and a high coulomb efficiency, from which it was learned that the polymer electrolyte of the present invention can be used as an excellent electrolyte material for the high-performance lithium secondary cells.

Figure 4:
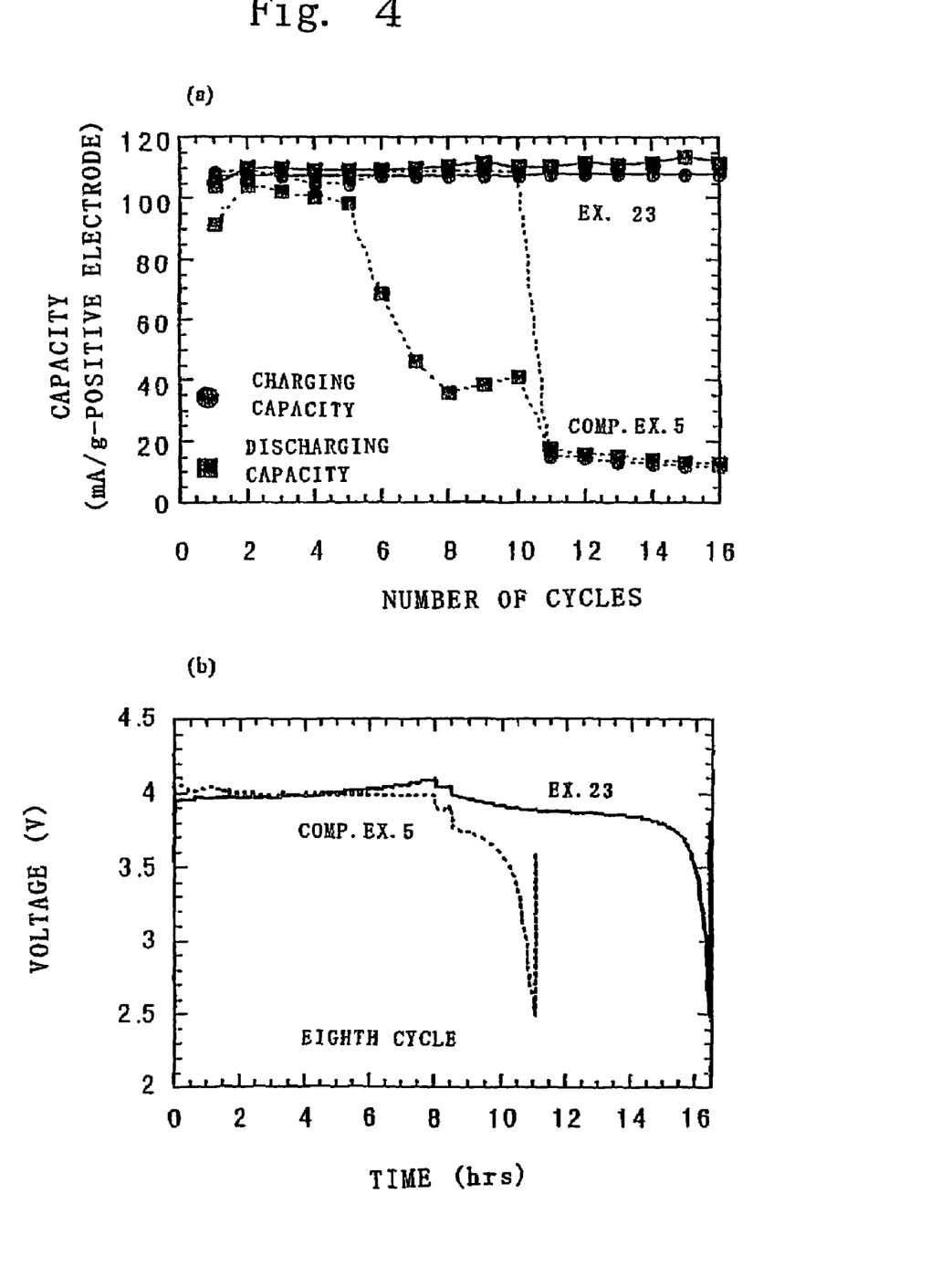
FIG. 4(a) illustrates charge/discharge cycle characteristics and FIG. 4(b) illustrates a charge/discharge curve at the eighth cycle.

The results were as shown in FIG. 4.

This cell maintained not less than 90% of the initial characteristics even after charge/discharge operation was repeated more than 100 times, proving the polymer electrolyte to be highly stable.

Example 26

<Charge/Discharge Cycle Characteristics>

Experiment same as that of Example 25 was conducted by using the polymer electrolyte material D of Example 17 and nearly the same charge/discharge characteristics as those of Example 25 was obtained.

Reference Example

<Charge/Discharge Cycle Characteristics>

The polymer electrolyte of Example 16 was used for the test cell same as that of Example 25. The charge/discharge characteristics deteriorated with an increase in the number of cycles. This was presumably due to that the electrolyte was affected by the unreacted acrylic acid remaining in the synthesis of the polymer. It is therefore desired to use the polymer material that has been completely esterified.

Example 27

<Charge/Discharge Cycle Characteristics>

The polymer electrolyte material B prepared in Preparation Example 2 was impregnated with a mixture solution of the propylene carbonate and the ethylene carbonate used in Example 15 (containing 1 mol/L of LiBF$_4$). The film was then heated at 85° C. to prepare a transparent solution. The solution was then applied onto both surfaces of a polyolefin separator (trade name: TN0028 or TN0029) of Asahi Kasei Co, pressurized, and cooled to obtain a polymer electrolyte film having a thickness of about 100 to 150 μm. By using this film as an electrolyte, a test cell same as that of Example 23 was prepared. In this case, too, the charge/discharge characteristics were nearly the same as those of Example 25.

Example 28

A polymer electrolyte was prepared by impregnating the polymer material A of Example 2 with a γ-butylolactone containing 1 mol/L of $(C_2H_5)_4NCF_3SO_3$. Nickel substrates were used as both electrodes which were then coated with ruthenium oxide and polyaniline film (10 μm thick). A test cell was fabricated by using these electrodes and the above polymer electrolyte to measure the capacitor characteristics. The obtained electric amount was 0.3 F/cm².

To evaluate the properties, the test capacitor was electrically charged by a constant-current method at a 10 C rate. As a result of charge/discharge testing, a discharge capacity of 99% of the charged capacity could be obtained, from which it was learned that the charge and discharge could be accomplished at a high rate.

It was learned that excellent capacitor characteristics were exhibited when the polymer electrolyte was prepared by using, in combination, a solvent having a high dielectric constant (ε=39) and a high boiling point (202° C./room temperature) like γ-butylolactone and a salt $(C_2H_5)_4NCF_3SO_3$.

Effect of the Invention

The present invention provides a novel olefinic polymer electrolyte material having a high ionic conductivity (having a lithium ion transport number comparable to that of PVDF), suppressing the precipitation of dendrite-like lithium, offering a favorable electrolyte solution-absorbing quality (retaining property), and making it possible to fabricate a cell that features excellent charge/discharge characteristics at low temperatures as well as at high temperatures.

The invention claimed is:

1. A gel-type polymer electrolyte, wherein said polymer comprises (A) an ethylene-unsaturated carboxylic acid copolymer or a derivative thereof and (B) a polyalkylene oxide having a hydroxyl group at one terminal thereof or a derivative thereof, which are bonded together by an ester bond.

2. A gel-type polymer electrolyte according to claim 1, wherein said ester bond is formed by the esterification of a carboxylic acid group of the ethylene-unsaturated carboxylic acid copolymer with the polyalkylene oxide having a hydroxyl group at one terminal thereof or with a derivative thereof.

3. A gel-type polymer electrolyte according to claim 1, wherein said ester bond is formed by the ester interchange reaction of an alkyl ester of the ethylene-unsaturated carboxylic acid copolymer or an alkyl ester derivative thereof with the polyalkylene oxide having a hydroxyl group at one terminal thereof or a derivative thereof.

4. A gel-type polymer electrolyte according to claim 1, wherein said polymer is formed by reacting the ethylene-unsaturated carboxylic acid copolymer or the derivative thereof (A) with the polyalkylene oxide having a hydroxyl group at one terminal thereof or the derivative thereof (B) at a molar ratio expressed by the following formula, $$B_{HYD}/A_{CAR}$$

wherein $B_{HYD}$ is a number of moles of hydroxyl groups of the polyalkylene oxide having a hydroxyl group at one terminal thereof or of the derivative thereof, and $A_{CAR}$ is a number of moles of carboxylic acid groups of the ethylene-unsaturated carboxylic acid copolymer or of the derivative thereof, of from 0.3 to 2.5.

5. A gel-type polymer electrolyte according to claim 4, wherein the remaining amount of the unreacted carboxylic acid groups in said polymer is not larger than 30 mol % on the basis of the carboxylic acid group of the ethylene-unsaturated carboxylic acid copolymer or the derivative thereof (A).

6. A gel-type polymer electrolyte according to claim 2, wherein said ethylene-unsaturated carboxylic acid copolymer or the derivative thereof (A) has a composition containing ethylene in an amount of from 50 to 98% by weight, an unsaturated carboxylic acid or an anhydride thereof in an amount of from 2 to 50% by weight, and other monomers in an amount of from 0 to 30% by weight.

7. A gel-type polymer electrolyte according to claim 3, wherein the alkyl ester of said ethylene-unsaturated carboxylic acid copolymer or the alkyl ester derivative thereof (A) has a composition containing ethylene in an amount of from 50 to 98% by weight, and an alkyl ester of an unsaturated carboxylic acid or an alkyl ester derivative thereof in an amount of from 2 to 50% by weight.

8. A gel-type polymer electrolyte according to claim 7, wherein the alkyl ester of said ethylene-unsaturated carboxylic acid copolymer is a methyl ester or an ethyl ester.

9. A gel-type polymer electrolyte according to claim 1, wherein said ethylene-unsaturated carboxylic acid copolymer or the derivative thereof (A) is an ionomer of which the carboxylic acid is partly neutralized with a monovalent metal or a multi-valent metal, the neutralization degree being in a range of from 0.5 to 60 mole %.

10. A gel-type polymer electrolyte according to claim 1, wherein said ethylene-unsaturated carboxylic acid copolymer or the derivative thereof (A) has a melt flow rate of from 0.1 to 500 g/10 min. at 190° C. under a load of 2160 g.

11. A gel-type polymer electrolyte according to claim 1, wherein the polyalkylene oxide having a hydroxyl group at one terminal thereof or the derivative thereof (B) has a number average molecular weight of from 200 to 100,000 and contains the ethylene oxide in an amount of from 30 to 100 mol %.

12. A gel-type polymer electrolyte according to claim 1, wherein a hydroxyl group at the other terminal of the polyalkylene oxide or the derivative thereof (B) is blocked by the etherification esterification or by the reaction with a monoisocyanate.

13. A gel-type polymer electrolyte according to claim 2, wherein the esterification of said ethylene-unsaturated carboxylic acid copolymer or the derivative thereof (A) with the polyalkylene oxide having a hydroxyl group at one terminal thereof or the derivative thereof (B) is conducted in the presence of an acid catalyst.

14. A gel-type polymer electrolyte according to claim 3, wherein the formation of the ester bond by the ester interchange reaction is conducted in the presence of an organometal catalyst.

15. A gel-type polymer electrolyte according to claim 1, wherein said polymer is partly crosslinked in the presence of at least one kind of crosslinking agent selected from the group consisting of polyhydric alcohol, mono(meth)acrylic acid or an ester thereof, polyethylene glycol di(meth)acrylate, unsaturated higher fatty acid or an ester thereof and polyethylene glycol diglycidyl ether.

16. A gel-type polymer electrolyte according to claim 15, wherein said crosslinking agent is present in the reaction system in an amount of from 0.1 to 30% by weight.

17. A gel-type polymer electrolyte according to claim 1, wherein said gel-type polymer takes the form of a powder, a film or a sheet.

18. A gel-type polymer electrolyte according to claim 1, wherein said gel-type polymer is impregnated with an electrolytic solution comprising an electrolytic salt and a nonaqueous electrolytic solution.

19. A gel-type polymer electrolyte according to claim 18, wherein the solvent exists in the electrolytic solution at a ratio of from 30 to 95% by weight on the basis of the sum of said polymer and said electrolytic solution;

20. A gel-type polymer electrolyte according to claim 18, wherein the electrolyte exists in the electrolytic solution at a ratio of from 1 to 30% by weight on the basis of the sum of said polymer and said electrolytic solution;

21. A gel-type polymer electrolyte according to claim 18, wherein the electrolyte in the electrolytic solution is a lithium salt.

22. A gel-type polymer electrolyte according to claim 18, wherein the solvent in the electrolytic solution is a nonaqueous electrolytic solvent.

23. A secondary cell equipped with a layer of a gel-type polymer electrolyte of claim 1.

24. A secondary cell according to claim 23, wherein said secondary cell is a lithium cell.

25. A capacitor equipped with a layer of a gel-type polymer electrolyte of claim 1.

* * * * *